INVENTOR.
REXFORD H. BRADT
BY Albert L. Jeffers
ATTORNEY

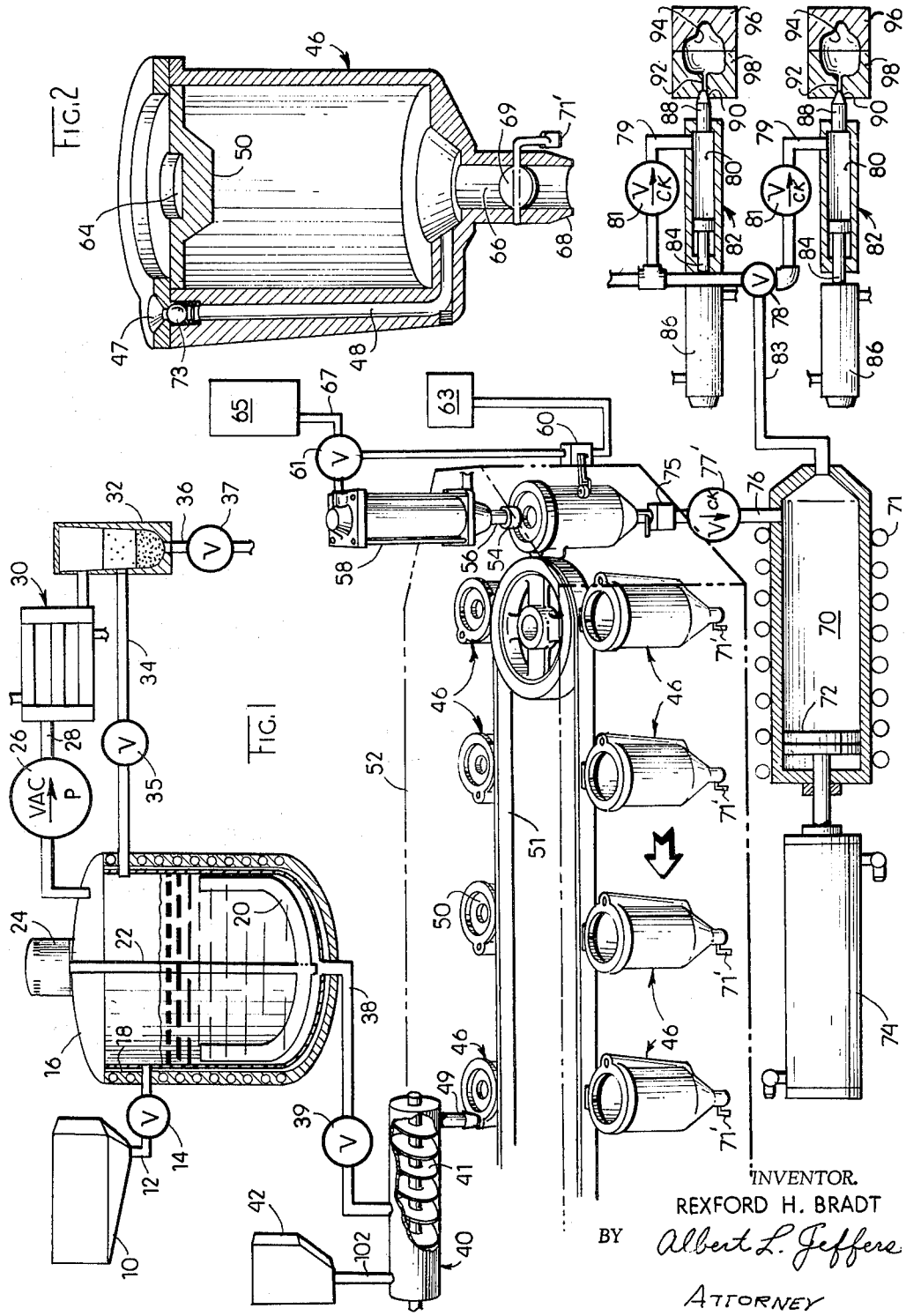

United States Patent Office 3,253,303
Patented May 31, 1966

3,253,303
INJECTION MOLDING APPARATUS
Rexford H. Bradt, 725 E. Fort Wayne St., Warsaw, Ind.
Filed June 20, 1962, Ser. No. 203,809
3 Claims. (Cl. 18—30)

This invention relates to improved apparatus for producing thermoplastic injection molded articles.

In order to produce an improved injection molded article, it is required that the plastic molding material be completely, or substantially completely, freed of volatile constituents such as unpolymerized monomer, air or the like, and must be maintained in as protected condition possible to shield the material against contamination by exposure to atmosphere. It is also desired that the material be exposed to a minimum extent to remelting and processing stages.

During handling of the plastic material, particularly during melting, agitation and transfer under pressure, it is quite easy to entrap air and other impurities which have the effect of producing inferior injection molded articles.

In contrast with previously used apparatus for making injection molded articles I propose in the present invention to provide a completely enclosed system wherein the plastic molding material is conveyed at all times without exposure either to atmosphere or any other source of contamination from the start of its manufacture from monomer to prepolymer to the formation of the finished molded shapes.

I propose to convey the plastic material entirely in a liquid phase condition from the introduction of monomeric or prepolymeric material through a partial polymerization stage or a devolatilization stage and a finishing stage where polymerization is completed and thence into an accumulator and finally into an injection stage where it is formed into a desired shape.

While it is not essential to the invention that the thermoplastic material be conveyed in a continuous stream or uninterrupted flow, it is necessary that the plastic material be at all times shielded against exposure to recontamination; it is further essential that the plastic material at some suitable stage be subjected to subatmospheric pressure in order to withdraw volatilizable contaminants as may be present; and, it is further necessary to maintain the thermoplastic material in a liquid phase condition during its passage from the start of the process to the point of injection under pressure within the mold.

As used herein the term "polymerized" is intended to mean a commercial degree of polymerization wherein substantially all of the monomer is converted to polymer bearing in mind that the final prepolymer is of variable molecular weight and is suitable for the particular application.

Several important consequences are involved in maintaining the plastic material in liquid phase, one of such consequences is that the plastic material is easier to convey under pressure in its liquid form than in a dry granular form, the second advantage is that volatizable contaminants are easier to separate from the body of the plastic material in a relatively low viscosity liquid prepolymeric form.

In a process of the type described, where plastic material is being handled in an enclosed system, provision must be made for the intermittent injection molding operation. The injection molding process is a discontinuous, intermittent operation and therefore the system is adapted to include a reservoir or accumulator for receiving a flow of partially polymerized, decontaminated, devolatilized liquid phase plastic material and discharging such material as it is needed in accordance with the schedule of the injection molding operation. In this manner, the system is always capable of coordinating the rate of transferral and degassification of the plastic material with the rate at which it is used in making injection molded articles.

Accordingly, it is one of the objects of the present invention to provide an apparatus for producing injection molded articles wherein the plastic material is conveyed within an enclosed system which precludes exposure to gas or other contamination-producing factors and in which the plastic material is introduced to the enclosed system in an incompletely polymerized condition, devolatilized during the conveyance thereof in a prepolymeric state or condition between the point of its entry and discharge into the injection mold in a completely polymerized condition.

It is a further object of the invention to provide a conveyance system for liquid state plastic material which is conveyable through a continuous conveying means in a continuous stream or by way of separate containers which can convey the plastic material in discontinuous increments.

It is also an object of the invention, regardless of the particular type flow, that a storage or accumulator means be included to receive the decontaminated, degassified liquid phase plastic material and discharge such material as it is required in accordance with a schedule of injection molding operations. This can be accomplished either by means of a variable storage capacity multi-shot volume accumulator which receives the liquid phase plastic and can be permanently emplaced or can comprise a container which is used and then replaced with a different container. An any rate I employ a volumetric capacity of the accumulator which is greater than a "one shot" volume i.e. greater than the volume of the die cavity and capable of retaining the plastic material in a liquid state in readiness for injection molding.

It is a further object of the invention that the plastic material, while it is en route within the distribution system, be subjected to subatmospheric pressure for a substantial length of time (not momentary), thereby promoting the removal of volatilizable material from the plastic material before its final polymerization and before it is injection molded to form the completed article. Consequently, the final product has a superior strength, appearance and uniformity of physical properties.

It is further an object of the present invention to provide an apparatus which will eliminate the previously followed "pelletizing" operation wherein the plastic material was formed into solid pellets and exposed to air and remelted and then injection molded. I have found however that in injection molding operations when the molding material is formed into pellets there are difficulties introduced to the system because the pellet tends to become recontaminated during handling, and the nonuniformity of pressure during molding and uneven mechanical working of the pellet tends to cause deterioration of the plastic material. Also, I have found that it is inherently more expensive to use the pelletized material as an intermediate because of the extra expense involved in forming and packaging and redrying it prior to use.

It is a further object to embody these foregoing principles within apparatus which includes means for novel devolatilizing and degassifying of the prepolymeric product to provide a uniform, highly strengthened and improved appearance product, and to retain the desirable condition of devolatilization by providing an enclosed, atmospherically protected conveyance system for liquid phase thermoplastic material, which is progressively polymerized but at no time beyond the liquid phase and is at no time subject to recontamination once it is devolatilized.

Another object of the invention is to provide, in conjunction with the novel apparatus providing a continuous or regulated flow of liquid phase material, additional means for blending with said liquid phase flow various additives during its passage to the injection mold, these additional materials being either copolymers, chemical additives, coloring agents, flame proofing agents, reinforcements, catalysts, fillers, or reground plastic, depending upon the compositional requirements of the molded article. Then additions are made at one or more points during the passage of the material.

Other objects and features of the invention will become apparent from a consideration of the following description, which proceeds with reference to the accompanying drawings, wherein a plurality of the example embodiments are set forth to illustrate the invention.

In the drawings:

FIGURE 1 is a combination schematic view and material flow diagram illustrating how the plastic material is converted from a monomer to a preferred degree of partial polymerization while it is being transported to the injection mold; and under conditions wherein liquid phase material is at all times protected from contamination. This embodiment illustrates discontinuous plastic flow;

FIG. 2 is a fragmentary detail view of one of the containers for transporting plastic material;

Figure 3:
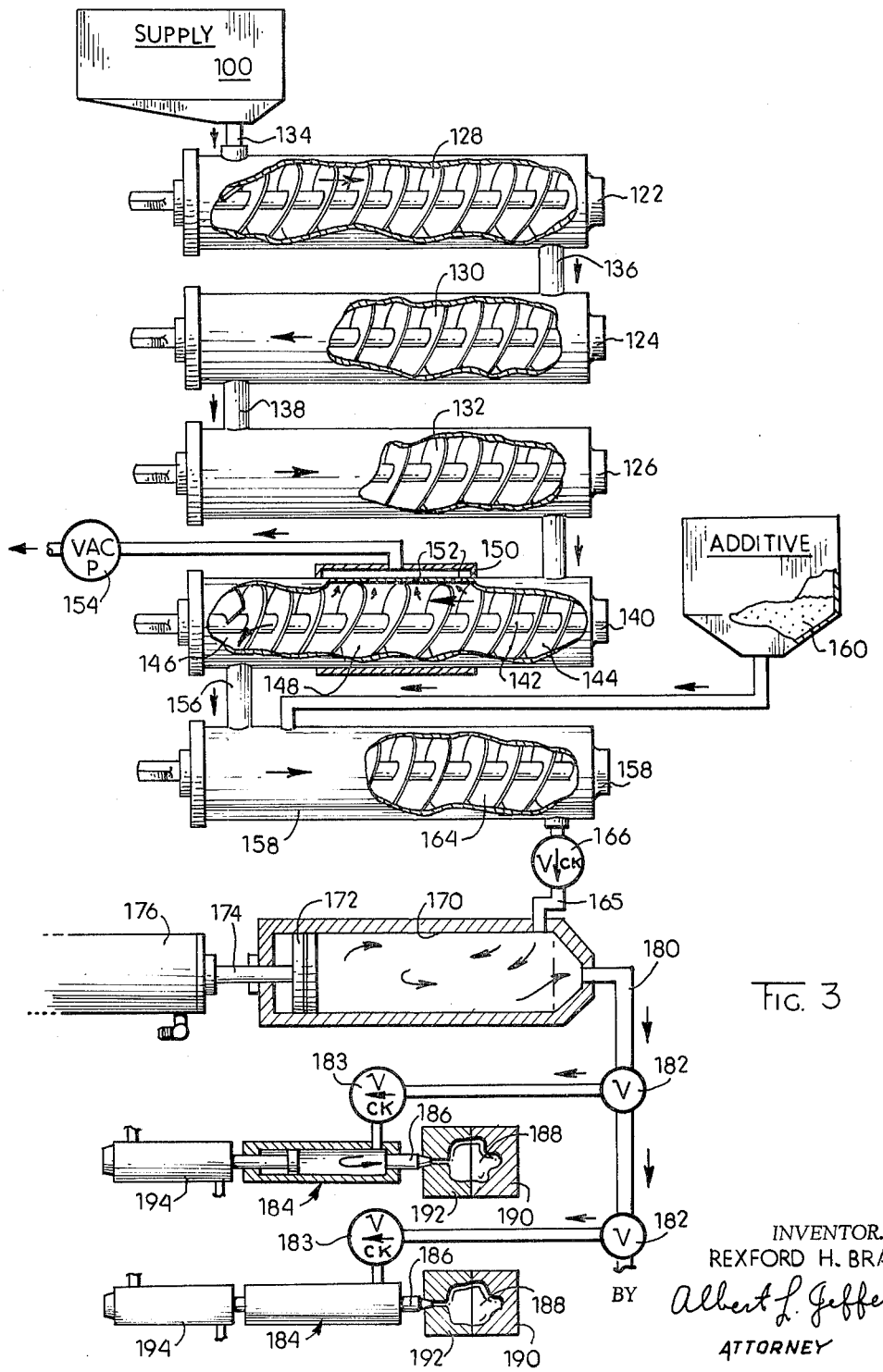
FIG. 3 illustrates a further embodiment of the invention in which a continuous flow of liquid phase material is provided between the initial polymerization and point of injection into the mold.

Referring now to the embodiment of FIGS. 1 and 2, assuming that the molded product is to be made from polystyrene, the liquid phase monomer provided in container 10 is stored therein under pressure and is introduced through line 12 having valve 14 to a closed vessel 16 which includes a jacket 18 used for controlling the temperature of the interior of the vessel 16. The contents of the vessel are agitated by a U-shaped agitator blade 20 which is rotated by a motor shaft 22 connecting with motor 24. The interior of the vessel is at subatmospheric pressure and connects with a vacuum pump 26 having an exhaust line 28. The subatmospheric pressure within the vessel serves to remove moisture, unpolymerized monomer and the like. Line 28 leads to a condenser 30, thence to a separator 32. A return line 34 conveys monomer back to the vessel 16 through valve 35 and a second line, discharge line 36 acting through valve 37 expels water and other contaminants from the system.

It should be understood that the polymeric material is not limited to polystyrene and can be changed as needed. Reference may be made to my now issued patent U.S. 2,877,501 for details of the plastic material for which the present invention is especially adapted.

After the monomer has been partially polymerized and is no longer a gaseous phase material it passes through line 38 having dispensing valve 39 and into a dispensing device 40 which includes a screw flight 41 for developing feed pressure on the plastic material. The dispensing device may include a container 42 which includes additional material for blending with the polymer at this state of manufacture. The blending container may however be eliminated and is not an essential part of the invention. Through this means however such added ingredients as catalysts, copolymeric ingredients, loading material, stabilizers, flame proofers, reground plastic, colors, depolymerizing inhibitors, etc., may be added to the plastic. From the dispensing device 40 the plastic material either blended here or before the accumulator step or used unblended is charged into container 46. The incoming prepolymer, which is typically of about three or four monomeric units, progresses through inlet orifice 47 (FIG. 2) of passage 48 and lifts the movable wall 50 to fill the interior of the container 46. There are a series of these containers 46 which are carried vertically on an endless conveyor chain or the like 51 which passes through an oven 52 for a sufficient period of time to bring the partially polymerized material to a higher degree of polymerization, it being understood, however, that the material is continuously enclosed and is, therefore, protected against re-contamination and remains in a liquid state and is not solidified within the container. The conveyor 51 (FIG. 1) brings the container into alignment with head 54 and plunger 56 which is operated by a power cylinder 58. Movement of the container 46 into position contacts pneumatic switch 60 to operate pneumatic valve 61 by power source 63 and communicates air under pressure from reservoir 65 through line 67 to effect actuation of the power cylinder 58.

The head 54, moving downwardly, engages the recess 64 of movable wall 50 and biases said wall 50 downwardly to discharge the plastic material through outlet 66 in discharge nozzle 68 of the container which includes a butterfly valve 69 with a cam operator 71' (FIG. 2). The cam operator 71' contacts a complementary cam (not shown) to close passage 66 when the container is in position to receive the incoming prepolymer from dispenser 40, said prepolymer being injected past ball valve 73 which allows for inflow of fluid plastic, but closes to prevent outflow of fluid through passage 48 when the wall 50 is biased downwardly. Since the butterfly valve 69 is open when the wall 50 is moved downwardly, the plastic fluid is discharged only through discharge nozzle 68 having a tapered end which registers with inlet 75 of line 76 past check valve 77'. The plastic material in liquid phase enters accumulator chamber 70 forcing wall 72 toward the left (FIGURE 1) against the yieldable resistance of hydraulic power cylinder 74.

A heating coil 71 (FIG. 1) is usable for fine adjustment of the temperature of the plastic material or the coil can be added at lines 79 just prior to entry into the cylinder chambers 80.

The accumulator is connected through line 83 having a three-way valve 78 and branch lines 79 each with a check valve 81, to cylinder bores 80 of injectors 82 each having a plunger 84 operated by a respective hydraulic power cylinder 86.

The outlet nozzle 88 of each injector 82 connects respectively with orifice 90 and passage 92 leading to die cavity 94 which is filled with liquid plastic material during the discharge stroke of plunger 84, and the plastic material is then heated within the die cavity to effect complete polymerization, following which the dies 96 and 98 are separated, and the finished article is extracted from the die cavity.

From the moment the monomer enters vessel 16 to the point when it enters die cavity 94, it is completely enclosed and is at no time subject to the contaminating influence of atmosphere. The thermoplastic material is maintained under vacuum by which is meant that the plastic material is either partially or wholly exhausted of air and other gases. Since monomer and other volatilizable contaminant material, including moisture and the like, are removed during the polymerization process the final product is improved in the respects noted in my previously filed and copending, now abandoned application relating to the production of thermoplastic pellets i.e. U.S. application No. 183,385 entitled "C" Process Thermoplastic Molding Material and Process for Making, filed March 29, 1962. In the present invention the decontaminated liquid polymer can at no time be re-contaminated and remains as a liquid material until polymerized in the form of the finished article, being shielded at all times in transit to the mold and polymerized by "degrees." During entire passage of the plastic material through the apparatus, because it is in a liquid state, it therefore, does not require excessive pressures to effect its displacement and therefore the polymer is evenly heated and uniformly decontaminated. As the liquid phase material passes through the apparatus, it is progressively polymerized from a monomer in container 10 to a polymer of about 3-4 monomeric units in vessel 16, reaching a maximum condition of polymerization but yet retaining its liquid state condition at the accumulator 70 and injectors 82.

If the plastic material is to be combined with other materials, such as pigment, copolymer, filler materials, catalysts and the like, such material can be added as indicated in FIG. 1, in which the dispenser 40 is connected with the closed vessel 42 through line 102. Within dispenser 40 screw flights 41 effect uniform mixing of the materials in addition to imposing a pressure-producing translating force thereon. The combination of vessels is so constituted so as at no time to expose the material to the contaminating influence of atmosphere, i.e., the vessels or conveyor members 40, 46, 70, 82 are all closed to atmosphere, and ingress of air is not permitted therein, nor during the time of transit between vessels which serve as the transport means. As the plastic material proceeds through the apparatus it is devolatilized, degassified, and progressively polymerized to be in an optimum condition at the time it is injection molded.

In operation, monomer is continuously or intermittently charged to the vessel 16 from supply container tank 10 through line 12 where it is agitated, subjected to vacuum, heated and at least partially polymerized. Decontamination occurs within the plastic material from which moisture and other volatilizable materials are removed by the vacuum action. Following partial polymerization and decontamination, the plastic material leaves through line 38 and is dispensed by dispenser 40 into containers 46 into which the prepolymer is injected while it is in a liquid state and is polymerized to a preferred extent. Note that the liquid state prepolymer while being handled is at no time exposed to atmosphere. While the prepolymer is contained in 46 it is further polymerized. Typically, the containers 46 will be filled with prepolymeric material for about one-half to two hours during which polymerization takes place at an oven temperature of about 250° F.

Representative injection pressures of about 1,000 p.s.i. with polystyrene, or more with some less flowable materials are used for discharging the plastic material from containers 46, by the action of power cylinder 58. The polymerization condition of the plastic normally does not change once it leaves the containers 46 but is maintained constant in the accumulator 70. The liquid state plastic material is then discharged as needed by the hydraulic cylinder 74 into the cylinder chamber 80 of the injector 82. The viscosity of the prepolymer at this point varies, of course, but is in the order of 200,000 centipoises at the time it is injected within the mold cavity 94.

To maintain a proper material flow balance, I regulate the inflow of monomer to the vessel 16 so that it approximates the rate of injection molding so that at no time will the vessels be in danger of overflowing. However, the accumulator serves the useful function of "storing" the prepolymer material which is brought to it in a discontinuous flow by the traveling containers 46 and the accumulator 70 provides in turn, always an available quantity to charge the injector cylinders 80. Thus, when the hydraulic cylinders 86 are operated to move the plungers 84 on their reverse stroke, the capacity and power output of accumulator 70 is sufficient to keep the injector cylinders filled with prepolymeric liquid state plastic. While the plungers 84 move on their discharge stroke, the valve 77' prevents reverse movement of the liquid phase plastic material, confining the direction of movement of plastic material within line 76 to movement in a cylinder 80 filling direction.

The accumulator 70 having heating coils 71 can have either a single injector or a plurality of injectors. The purpose of valve 78 is to provide one, or both, of the injectors in series with the accumulator 70 depending upon production requirements.

The present invention is in no way limited to a particular plastic material which can be used. Copolymers or polymers may be obtained by suitable selection of the prepolymeric materials and used in the foregoing process. Those plastic materials specifically which are best suited for the operation of the present invention but not limited thereto include polystyrene, nylon, styrene-acrylonitrile copolymer, styrene butadiene copolymer, numerous copolymeric "block polymers," methyl methacrylate and copolymers of the foregoing materials, or other peroxy or organic peroxy catalyzable materials. In short, the present invention is suitable for plastic materials which polymerize in mass and do not require solvents and the like. Also, polymers requiring a suitable catalyst are usable since my teaching includes a ready means for adding further ingredients such as catalysts while the plastic material is undergoing conveyance.

In a further embodiment of the invention, it is possible to provide a continuous line connection from outlet line 38 of vessel 16, passing through the polymerization oven 52 and connecting through a check valve 77' with accumulator 70. Also, the accumulator 70 can connect through a manifold with a plurality of injectors 82 each of which is operative with a respective die. In this manner the rate of production can be even further increased.

Referring next to FIG. 3, the pre-mixed monomers, prepolymers, from storage supply vessel 100 are led to a plurality of in-series channels 122, 124, 126 each having a worm flight 128, 130 and 132, these channels being progressively heated so that the monomer is brought through stages of polymerization to a preferred monomeric unit level. Note that the conveyors are connected in series through lines 134, 136 and 138 so that the prepolymer travels toward the right in unit 122, toward the left in unit 124, toward the right in unit 126.

When the plastic material reaches channel 140, it is stripped of volatile material. For this purpose, it contains a worm flight 142 having closely spaced flight sections 144 and 146 and a second series of flights 148 which are spaced farther apart to relieve the compacting pressure on the plastic material and at that stage, a jacket 150 surrounding aspirating openings 152 in the channel 140 wall connects with a vacuum pump 154 and therefore volatilizable materials such as monomer, moisture and the like. The devolatilized material then leaves the channel through line 156 to channel 158 wherein it is joined by a flow of blending material 160 and is blended by worm gear 164 and then passes through line 165 having check valve 166 to accumulator 170 having a ram 172 which is moved by a plunger 174 connecting with the hydraulic cylinder 176. When the ram 172 moves on its pressure stroke, the prepolymer is discharged through a line 180 having selector valves 182 and past check valves 183 into injectors 184 which control the movement of prepolymeric material through their respective outlet nozzles 186 connecting with die cavity 188 and the two dies 190, 192. The injector in this case is controlled the same as in the previous embodiment by means of a power hydraulically actuated power cylinder 194, the details of which do not form a part of the present invention.

In this embodiment of the invention, there is a continuous, as distinguished from irregular flow of plastic material effected in the previous embodiment, illustrating that the particular form of prepolymeric flow is an unessential part of the present invention, and can be made according to design requirements.

In operation, there is a continuous supply of monomer material from the inlet vessel 100 and the material passages continuously as a liquid flow, progressing in its polymerization and receiving the blending material and is fed continuously to the accumulator where it is periodically discharged to the ejector which can be connected either with a single die cavity or through a manifold to a plurality of ejectors each of which is connected with a respective die cavity.

The advantage of the accumulator is that irregularities of either inlet or outlet flow can be tolerated within the volumetric capacity of the accumulator. There is assured with the accumulator a sufficient quantity of degassified and decontaminated liquid phase prepolymer to meet the intermittent requirement of the injection molds which are operated either simultaneously or asynchronously.

The accumulator also assures a given input injection pressure on the plastic material which, being liquid, is assured of sufficient mobility so that it can be transferred under pressure which is communicated throughout all parts of the liquid by the plunger 172, except when prevented by the check valve 166.

It will be understood that those skilled in the art can be expected to make numerous modifications and revisions in the present invention to suit individual design requirements, and it is intended that such changes and revisions which incorporate the herein disclosed principles will be included within the scope of the following claims as equivalents of the invention.

What is claimed is:

1. Apparatus for injection molding operations, comprising means for supplying a regulated flow of prepolymeric plastic material, a plurality of in-series transport means having movable means therein which effect displacement of plastic material from within said transport means, such plastic material being maintained throughout its transport in a liquid state condition, accumulator means for receiving the liquid state polymerized plastic material from said in-series transport means and for storing it in liquid state therein, means for metering liquid state plastic material from said accumulator means concurrently with receiving such material from said transport means in accordance with injection molding schedule of operations, and means for imposing a subatmospheric pressure on said plastic material, and means for maintaining such plastic material under vacuum as it is conveyed and subsequently supplied in accordance with injection molding schedule of operations.

2. Apparatus for injection molding operations, comprising means for supplying a regulated flow of prepolymeric plastic material, a plurality of in-series transport means having movable means therein which effect displacement of plastic material from within said transport means, such plastic material being maintained throughout its transport in a liquid state condition, accumulator means for receiving the liquid state polymerized plastic material from said in-series transport means and for storing it in liquid state therein, means for metering liquid state plastic material from said accumulator means concurrently with receiving such material from said transport means in accordance with injection molding schedule of operations, means for imposing a subatmospheric pressure on said plastic material, and means for maintaining such plastic material under vacuum as it is conveyed and subsequently supplied in accordance with injection molding schedule of operations, and means for introducing additional material to said polymeric material during its movement to said transport means and under controlled atmospheric conditions whereby said polymeric material is selectively blended with additional material.

3. Apparatus for injection molding operations, comprising means for supplying a regulated flow of prepolymeric plastic material, a plurality of in-series transport means having movable means therein which effect displacement of plastic material from within said transport means, such plastic material being maintained throughout its transport in a liquid state condition, accumulator means for receiving the liquid state polymerized plastic material from said in-series transport means and for storing it in liquid state therein, means for metering liquid state plastic material from said accumulator means concurrently with receiving such material from said transport means in accordance with injection molding schedule of operations, means for imposing a subatmospheric pressure on said plastic material, and means for maintaining such plastic material under vacuum at it is conveyed and subsequently supplied in accordance with injection molding schedule of operations, and a plurality of rotatable conveyors within each of said in-series transport means to effect working on the plastic material, and heating thereof to provide a progressive controllable polymerization of said plastic material.

References Cited by the Examiner

UNITED STATES PATENTS

| | | | |
|---|---|---|---|
| 1,156,096 | 10/1915 | Price | 18—12 |
| 2,146,532 | 2/1939 | Crane et al. | |
| 2,309,729 | 2/1943 | Gordon | 18—55 |
| 2,338,607 | 1/1944 | Wacker | 18—55 |
| 2,458,068 | 1/1949 | Fuller | 18—12 |
| 2,540,146 | 2/1951 | Stober | 18—55 |
| 2,697,854 | 12/1954 | Boasson et al. | 18—30 |
| 2,735,840 | 2/1956 | Lynch | 18—54 |
| 2,881,477 | 4/1959 | Triulzi | 18—30 |

ALEXANDER H. BRODMERKEL, *Primary Examiner.*

A. L. LEAVITT, *Assistant Examiner.*